US008660264B2

(12) United States Patent
Pezeshki et al.

(10) Patent No.: US 8,660,264 B2
(45) Date of Patent: Feb. 25, 2014

(54) METHOD AND APPARATUS FOR MINIMIZING DIFFERENTIAL POWER ATTACKS ON PROCESSORS

(75) Inventors: Farhad Pezeshki, Toronto (CA); Robert J. Lambert, Cambridge (CA)

(73) Assignee: Certicom Corp., Mississauga, Ontario, CA (US)

( * ) Notice: Subject to any disclaimer, the term of this patent is extended or adjusted under 35 U.S.C. 154(b) by 0 days.

(21) Appl. No.: 13/621,021

(22) Filed: Sep. 15, 2012

(65) Prior Publication Data

US 2013/0101112 A1 Apr. 25, 2013

Related U.S. Application Data

(63) Continuation of application No. 11/483,553, filed on Jul. 11, 2006, which is a continuation of application No. 09/900,959, filed on Jul. 10, 2001, now Pat. No. 7,092,523, which is a continuation-in-part of application No. PCT/CA00/00021, filed on Jan. 11, 2000, which is a continuation-in-part of application No. PCT/CA00/00030, filed on Jan. 14, 2000.

(30) Foreign Application Priority Data

Jan. 11, 1999 (CA) ..................................... 2258338
Jan. 15, 1999 (CA) ..................................... 2259089

(51) Int. Cl.
*H04L 9/00* (2006.01)

(52) U.S. Cl.
USPC .................... 380/28; 380/30; 380/44; 726/36

(58) Field of Classification Search
CPC .................................................... H04L 9/3066
USPC .................................. 380/28, 30, 44; 726/36
See application file for complete search history.

(56) References Cited

U.S. PATENT DOCUMENTS

| 4,519,036 | A | 5/1985 | Green |
| 5,201,000 | A | 4/1993 | Matyas et al. |
| 5,202,995 | A | 4/1993 | O'Brien |
| 5,511,198 | A | 4/1996 | Hotta |
| 5,524,222 | A | 6/1996 | Hervin |
| 5,581,616 | A | 12/1996 | Crandall |
| 5,627,893 | A | 5/1997 | Demytko |
| 5,650,948 | A | 7/1997 | Gafter |
| 5,675,645 | A | 10/1997 | Schwartz et al. |
| 5,757,918 | A | 5/1998 | Hopkins |
| 5,764,772 | A | 6/1998 | Kaufman et al. |
| 5,768,389 | A | 6/1998 | Ishii |
| 5,778,069 | A | 7/1998 | Thomlinson et al. |
| 5,825,880 | A | 10/1998 | Sudia et al. |
| 5,892,899 | A | 4/1999 | Aucsmith et al. |
| 5,937,066 | A | 8/1999 | Gennaro et al. |
| 6,233,339 | B1 | 5/2001 | Kawano et al. |
| 6,279,110 | B1 | 8/2001 | Johnson et al. |
| 6,298,135 | B1 | 10/2001 | Messerges et al. |
| 6,304,658 | B1 | 10/2001 | Kocher et al. |
| 6,334,189 | B1 | 12/2001 | Granger et al. |
| 6,411,715 | B1 | 6/2002 | Liskov et al. |
| 6,419,159 | B1 | 7/2002 | Odinak |
| 6,446,207 | B1 | 9/2002 | Vanstone et al. |
| 6,496,929 | B2 | 12/2002 | Lenstra |
| 6,724,894 | B1 | 4/2004 | Singer |
| 6,873,706 | B1 * | 3/2005 | Miyazaki et al. ............... 380/30 |
| 7,421,074 | B2 | 9/2008 | Jin et al. |
| 2001/0053220 | A1 | 12/2001 | Kocher et al. |
| 2002/0166058 | A1 | 11/2002 | Fueki |
| 2003/0044003 | A1 | 3/2003 | Chari et al. |
| 2003/0048903 | A1 | 3/2003 | Ito et al. |
| 2003/0061498 | A1 | 3/2003 | Drexler et al. |
| 2008/0140995 | A1 | 6/2008 | Fukazawa |

FOREIGN PATENT DOCUMENTS

| CA | 2129203 | 1/1996 |
| CA | 2316227 | 7/1999 |
| EP | 383985 | 8/1990 |
| FR | 2672402 | 8/1992 |
| JP | 9-62596 | 7/1997 |
| JP | 10-091531 | 4/1998 |
| JP | 10-187546 | 7/1998 |
| JP | 10-200520 | 7/1998 |
| JP | 2008-146384 | 6/2008 |
| WO | 98/00771 | 1/1998 |
| WO | 98/52319 | 11/1998 |
| WO | 99/35782 | 7/1999 |
| WO | 00/42733 | 7/2000 |
| WO | 00/77973 | 12/2000 |

OTHER PUBLICATIONS

Office Action issued in Japanese Application No. 2012-134710 on Mar. 22, 2013; 5 pages.
Certicom Corp. Response to Opponent's Third Writ of Jan. 24, 2012 re EP Application No. 03 018 048.3; dated Jun. 27, 2012; 8 pages.

(Continued)

*Primary Examiner* — Jacob Lipman
(74) *Attorney, Agent, or Firm* — Fish & Richardson P.C.

(57) ABSTRACT

A method of masking a cryptographic operation using a secret value, comprising the steps of dividing the secret value into a plurality of parts; combining with each part a random value to derive a new part such that the new parts when combined are equivalent to the original secret value; and utilizing each of the individual parts in the operation.

15 Claims, 5 Drawing Sheets

(56) References Cited

OTHER PUBLICATIONS

Office Action issued in Japanese Application No. 2010-5363 on Jun. 8, 2012; 9 pages.
Anderson, John C.; "Response to NIST's Proposal"; Communications of the ACM; vol. 35, No. 7; Jul. 1992; pp. 41-54.
Chae Hoon Lim et al., "A Key Recovery Attack on Discrete Log-Based Schemes Using a Prime Order Subgroup"; Lecture Notes in Computer Science, Springer-Varlag, Aug. 1997, vol. 1294, p. 249-263.
Deitel, Harvey et al.; "C++ How to Program"; 1994; pp. 58-62.
Huhnlein, Detlef; "Vergleichende Implementierung eines auf Elliptischen Kurven basierenden Signaaturverfahrens in affiner und projektiver Arithmetik"; Dissertation, eingereicht bei der Fachhochschule Wurzburg-Schweinfurt-Aschaffenburg; Nov. 14, 1995; abridged version; 18 pages.
Ikeno Shinichi et al., "Gendai Angou-ron (Modern Cryptology)", Syadan-hojin Denshi-Tsushin Gakkai, Sep. 1, 1986, 1st Ed., p. 105-108.
Johnson, Don et al.; The Elliptic Curve Digital Signature Algorithm (ECDSA); Certicom Corporation White Paper; 2001; pp. 25-26.
Kelsey, John et al.; "Side Channel Cryptanalysis of Produce Ciphers"; Journal of Computer Security; vol. 8, No. 2-3; 2000; pp. 141-158.
Kocher et al.; "Differential Power Analysis"; Advances in Cryptology—CRYPTO '99; 19th International Annual Cryptology Conference; Aug. 1999; 10 pages.
Kocher, Paul et al.; "Introduction to Differential Power Analysis and Related Attacks"; 1998; 5 pages. <http://www.cryptography.com/dpa/technical/index.html>.
Kocher, Paul; "Timing Attacks on Implementations of Diffie-Hellman, RSA, DSS and Other Systems"; downloaded Nov. 11, 1998; 11 pages. <http://www.cryptography.com/timing attack/paper.html>.
Kocher, Paul C.; "Timing Attacks on Implementations of Diffie-Hellman, RSA, DSS and Other Systems"; Lecture Notes in Computer Science; Advances in Cryptology—CRYPTO '96; Aug. 1996; vol. 1109; pp. 104-113.
Koeune, Francis et al. "A Timing Attack Against Rijndael"; UCL Crypto Group Technical Report Series; CG-1999/1; Jun. 10, 1999. <http://eref.uqu.edu/sa/files/Others/Timing%20Attacks/A%20timing%20attack%against%20Rijndael. pdf>.
Menezes A., et al.; "Elliptic Curve Cryptosystems and Their Implementation"; Journal of Cryptography; vol. 6, No. 4; 1993; pp. 209-224.
Menezes, Alfred J. et al.; "Handbook of Applied Cryptography"; 1996; pp. 63-77, 451-454, 515-520.
Schnorr, C.P.; "Efficient Signature Generation by Smart Cards"; Journal of Cryptology, 4; 1991; pp. 161-174.
Wharton, John; "An Introduction to the IntelR MCS-s1 TM Single-Chip Microcomputer Family"; Intel Application Note AP-69; May 1980; 30 pages.
Office Action issued in U.S. Appl. No. 09/900,959 on Jul. 28, 2005; 8 pages.
Office Action issued in U.S. Appl. No. 09/900,959 on Dec. 20, 2005; 7 pages.
Notice of Allowance issued in U.S. Appl. No. 09/900,959 on Mar. 27, 2006; 3 pages.
Office Action issued in U.S. Appl. No. 11/483,553 on May 27, 2009; 7 pages.
Notice of Allowance issued in U.S. Appl. No. 11/483,553 on Dec. 1, 2009; 4 pages.
Notice of Allowance issued in U.S. Appl. No. 11/483,553 on Mar. 11, 2010; 4 pages.
Notice of Allowance issued in U.S. Appl. No. 11/483,553 on Oct. 27, 2010; 4 pages.
Notice of Allowance issued in U.S. Appl. No. 11/483,553 on May 12, 2011; 6 pages.
Office Action issued in U.S. Appl. No. 11/483,553 on Aug. 17, 2011; 5 pages.
Office Action issued in U.S. Appl. No. 11/483,553 on Dec. 16, 2011; 6 pages.
Office Action issued in U.S. Appl. No. 11/483,553 on Feb. 15, 2012; 7 pages.
Office Action issued in U.S. Appl. No. 11/483,553 on May 24, 2012; 6 pages.
Advisory Action issued in U.S. Appl. No. 11/483,553 on Aug. 30, 2012; 3 pages.
Office Action issued in U.S. Appl. No. 12/837,268 on Dec. 16, 2011; 5 pages.
Office Action issued in U.S. Appl. No. 12/837,268 on Feb. 23, 2012; 6 pages.
Office Action issued in U.S. Appl. No. 12/837,268 on May 16, 2012; 6 pages.
Advisory Action issued in U.S. Appl. No. 12/837,268 on Aug. 23, 2012; 3 pages.
Communication Pursuant to Article 96(2) EPC issued in European Application No. 00900195.9 on Jan. 24, 2002; 3 pages.
Communication under Rule 51(4) EPC issued in European Application No. 00900195.9 on Feb. 12, 2003; 23 pages.
European Search Report issued in European Application No. 03018048.3 on Feb. 17, 2006; 3 pages.
Communication Pursuant to Article 96(2) EPC issued in European Application No. 03018048.3 on Dec. 28, 2006; 5 pages.
Communication under Rule 71(3) EPC issued in European Application No. 03018048.3 on Jul. 18, 2008; 26 pages.
Communication of Notices of Opposition issued in European Patent No. 1365308 on Nov. 6, 2009 (1 page) and Opposition filed in European Patent No. 1365308 by Christoph Mueller on Sep. 29, 2009 (49 pages); English translation of Notice of Opposition (27 pages).
Reply to Opposition filed in European Patent No. 1365308 on May 17, 2010; 48 pages.
Opponent Reply filed in European Patent No. 1365308 on Dec. 9, 2010; 28 pages; English translation of Opponent Reply filed in European Patent No. 1365308 on Dec. 9, 2010; 27 pages.
Proprietor Reply filed in European Patent No. 1365308 on Jul. 8, 2011; 16 pages.
Office Action issued in Japanese Application No. 2000-594019 on Apr. 16, 2010; 15 pages.
Office Action issued in Japanese Application No. 2000-594019 on Sep. 29, 2010; 14 pages.
Office Action issued in Japanese Application No. 2000-594019 on Aug. 30, 2011; 8 pages.
Office Action issued in Japanese Application No. 2000-594019 on Feb. 15, 2012; 17 pages.
International Search Report issued in International Application No. PCT/CA00/00021 on May 11, 2000; 2 pages.
Written Opinion issued in International Application No. PCT/CA00/00021 on Nov. 6, 2000; 6 pages.
International Preliminary Examination Report issued in International Application No. PCT/CA00/00021 on Apr. 19, 2001; 7 pages.
Response to Written Submissions in EP Application No. 03 018 048.3 on Jan. 24, 2012; 32 pages.
Summons to Attend Oral Proceedings and Preliminary Opinion issued in European Application No. 03018048.3 dated Nov. 2, 2012; 20 pages.
Opponent's Opposition Submission filed in European Application No. 03018048.3 on Mar. 10, 2013; 1 page; English translation of Opponent's Opposition Submission; 1 page.
Certicom Corp. Written Submission filed in European Application No. 03018048.3 on Mar. 15, 2013; 151 pages.
Koji, Kusuda; "Current Condition and Problem Relating to Safety Estimation of Disclosed Key Secret Code Method"; Financial Research Center of Bank of Japan Discussion/Paper/Series (1997); Financial Research Center Bank of Japan [online]; Apr. 1, 1998; pp. 94-95 (cited in the Office Action issued in related Japanese Application No. 2012-134710 on Aug. 14, 2013).
Office Action issued in Japanese Application No. 2012-134710 on Aug. 14, 2013; 10 pages.

* cited by examiner

| LINE# | SOURCE TEXT | |
|---|---|---|
| 1 | TH = a random number between VMIN and VMAX | |
| 2 | FOR V from VMIN to VMAX do | |
| 3 | IF V < TH THEN | |
| 4 | DO statements1 | {branch1} |
| 5 | ELSE | |
| 6 | DO statements2 | {branch2} |
| 7 | OF | |

| Line # | Source Text | | Comment |
|---|---|---|---|
| A1 | | MOV A,V | Block a |
| A2 | | CALL IRRITATE_1 | |
| A3 | | JMP DO_REAL | |
| A4 | | JMP DO_VOID | |
| | | ... | |
| B1 | IRRITATE_1: | MOV R0,KNOWN_DISPLACEMENT | Block b |
| B2 | | SUB R0,THRESHOLD | |
| b3 | | MOV DPTR,R0 | |
| b4 | | JMP @A+DPTR | |
| | | ... | |
| c1 | | JMP L1 | Block c |
| c2 | | JMP L1 | |
| c3 | | JMP L1 | |
| c4 | | JMP L1 | |
| c5 | | JMP L1 | |
| c6 | | JMP L1 | |
| c7 | | JMP L1 | |
| c8 | | JMP L1 | |
| c9 | | JMP L2 | |
| c10 | | JMP L2 | |
| c11 | | JMP L2 | |
| c12 | | JMP L2 | |
| c13 | | JMP L2 | |
| c14 | | JMP L2 | |
| c15 | | JMP L2 | |
| c16 | | JMP L2 | |
| c17 | L1: | POP A | |
| c18 | | ADD #0 | |
| c19 | | PUSH A | |
| c20 | | RET | |
| c21 | L2: | POP A | |
| c22 | | ADD #1 | |
| c23 | | PUSH A | |
| c24 | | RET | |
| d1 | DO_REAL: | Statements1 | Block d |
| d2 | | ... | |
| e1 | DO_VOID: | Statements2 | Block e |
| e2 | | ... | |

50         Figure 2

| Line # | Source Text | | Comments |
|---|---|---|---|
| f1 | | MOV A,V | Block f |
| f2 | | MOV DPTR,MASKED_RANDOM | |
| f3 | | CALL IRRITATE_2 | |
| f4 | | JMP DO_REAL | |
| f5 | | JMP DO_VOID | |
| | | ... | |
| | | ... | |
| g1 | IRRITATE_2: | JMP @A+DPTR | Block g |
| g2 | | ... | |
| | | ... | |
| h1 | | op1 | Block h |
| h2 | | op2 | |
| h3 | | op3 | |
| h4 | | op4 | |
| h5 | | op5 | |
| h6 | | op6 | |
| h7 | | op7 | |
| h8 | | POP A | |
| h9 | | ADD #0 | |
| h10 | | PUSH A | |
| h11 | | RET | |
| h12 | | Op1 | |
| h13 | | Op2 | |
| h14 | | op3 | |
| h15 | | op4 | |
| h16 | | op5 | |
| h17 | | op6 | |
| h18 | | op7 | |
| h19 | | POP A | |
| h20 | | ADD #1 | |
| h21 | | PUSH A | |
| h22 | | RET | |
| i1 | DO_REAL: | Statements1 | Block i |
| i2 | | ... | |
| | | ... | |
| j1 | DO_VOID: | Statements2 | Block j |
| j2 | | ... | |
| | | ... | |

Figure 3

| Line # | Source Text | Comments |
|---|---|---|
|  | MOV A,V<br>JMP IRRITATE_1<br>...<br>... | Block k |
|  | IRRITATE_1: MOV R0,KNOWN_DISPLACEMENT<br>SUB R0,THRESHOLD<br>MOV DPTR,R0<br>JMP @A+DTPR<br><br>...<br>...<br>JMP DO_VOID<br>JMP DO_VOID<br>JMP DO_VOID<br>JMP DO_VOID<br>JMP DO_VOID<br>JMP DO_VOID<br>JMP DO_VOID<br>JMP DO_VOID<br>KNOWN_DISPLACEMENT:<br>JMP DO_REAL<br>JMP DO_REAL<br>JMP DO_REAL<br>JMP DO_REAL<br>JMP DO_REAL<br>JMP DO_REAL<br>JMP DO_REAL<br>JMP DO_REAL | Block l |
|  | DO_REAL:<br>...<br>... | Block m |
|  | DO_VOID:<br>...<br>... | Block n |

Figure 4

METHOD AND APPARATUS FOR MINIMIZING DIFFERENTIAL POWER ATTACKS ON PROCESSORS

CROSS REFERENCE TO RELATED APPLICATIONS

This application is a continuation of U.S. patent application Ser. No. 11/483,553 filed on Jul. 11, 2006 which is a continuation of U.S. patent application Ser. No. 09/900,959 filed on Jul. 10, 2001, and now issued as U.S. Pat. No. 7,092,523, which is a continuation-in-part of PCT Application No. PCT/CA00/00021 filed on Jan. 11, 2000, which claims priority from Canadian Patent Application No. 2,258,338 filed on Jan. 11, 1999 and is also a continuation-in-part of PCT Application No. PCT/CA00/00030 filed on Jan. 14, 2000, which claims priority from Canadian Patent Application No. 2,259,089 filed on Jan. 15, 1999 all of which are hereby incorporated by reference.

FIELD OF THE INVENTION

This invention relates to cryptographic systems and in particular to a method and apparatus for minimizing successful power analysis attacks on processors.

BACKGROUND OF THE INVENTION

Cryptographic systems generally owe their security to the fact that a particular piece of information is kept secret, without which it is almost impossible to break the scheme. This secret information must generally be stored within a secure boundary, making it difficult for an attacker to get at it directly however, various schemes or attacks have been attempted in order to obtain the secret information. Of particular risk are portable cryptographic tokens, including smart cards and the like. Of the more recent attacks performed on these particularly vulnerable devices are simple power analysis, differential power analysis, higher order differential power analysis and other related techniques. These technically sophisticated and extremely powerful analysis tools can be used by an attacker to extract secret keys from cryptographic devices. It has been shown that these attacks can be mounted quickly and can be implemented using readily available hardware. The amount of time required for these attacks depends on the type of attack and varies somewhat by device. For example it has been shown that a simple power attack (SPA) typically take a few seconds per card, while the differential power attacks (DPA) can take several hours.

Encryption operations are performed in a processor operating in a sequential manner by performing a sequence of fundamental operations, each of which generates a distinct timing pattern. Laborious but careful analysis of end-to-end power waveforms can decompose the order of these fundamental operations performed on each bit of a secret key and thus be, analyzed to find the entire secret key, compromising the system.

In the simple power analysis (SPA) attacks on smart cards and other secure tokens, an attacker directly measures the token's power consumption changes over time. The amount of power consumed varies depending on the executed microprocessor instructions. A large calculation such as elliptic curve (EC) additions in a loop and DES rounds, etc, may be identified, since the operations performed with a microprocessor vary significantly during different parts of these operations. By sampling the current and voltage at a higher rate, i.e. higher resolution, individual instructions can be differentiated.

The differential power analysis attack (DPA) is a more powerful attack than the SPA and is much more difficult to prevent. Primarily, the DPA uses statistical analysis and error correction techniques to extract information which may be correlated to secret keys, while the SPA attacks use primarily visual inspection to identify relevant power fluctuations. The DPA attack is performed in two steps. The first step is recording data that reflects the change in power consumed by the card during execution of cryptographic routines. In the second step, the collected data is statistically analyzed to extract information correlated to secret keys. A detailed analysis of these attacks is described in the paper entitled "Introduction to Differential Power Analysis and Related Attacks" by Paul Kocher et al.

Various techniques for addressing these power attacks have been attempted to date. These include hardware solutions such as providing well-filtered power supplies and physical shielding of processor elements. However, in the case of smart cards and other secure tokens, this is unfeasible. The DPA vulnerabilities result from transistor and circuit electrical behaviors that propagate to expose logic gates, microprocessor operation and ultimately the software implementations.

In software implementation of cryptographic routines, particularly on smart cards, branches in program flow are particularly vulnerable to power analysis measurements. Generally, where the program flow reaches a branch, then based on some distinguishing value V, one of two branches of the program is executed. To distinguish between the two possible cases, V is compared with a threshold value and a jump to one of two locations is executed as a result of the comparison. This is illustrated by referring to FIG. 1, where a flow diagram showing the implementation of a typical conditional jump according to the prior art is shown generally by 10. Generally a conditional jump implements an "IF condition THEN statement1 ELSE statement2" clause. In this case, the flow diagram indicates a scenario where a distinguishing value V varies within a range and the condition is whether a threshold value TH is crossed by the distinguishing value V or not. The threshold TH is a random number between an upper limit and a lower limit VMAX and VMIN, respectively. Thus, it may be seen in FIG. 1 if V<TH the program executes statements1 or if V≥TH, the program executes statement2. This may be repeated for all values of V from VMIN to VMAX.

As outlined earlier by utilizing a simple power analysis technique, it is possible for an observer to distinguish whether the "IF" branches or the "ELSE" branch is being executed. This however, does assume that the statements1 and statements2 consist of two identical sets of instructions that serve different purposes. Power or current consumption measurements on some smart cards can reveal which branch was taken. In some cases, some status flags on the chip may be set or reset. These flags may also be used for SPA.

Accordingly, there is a need for a system for reducing the risk of a successful power analysis attacks and which is particularly applicable to current hardware environments.

SUMMARY OF THE INVENTION

It is an object of this invention is to provide a method for minimizing power analysis attacks on processors.

In accordance with this invention there is provided a method of masking a conditional jump operation in a processor, wherein program execution jumps to one of two branches dependent on a first or second condition of a distinguishing value V relative to a reference value and wherein the reference is bounded by an upper limit Vmax and a lower limit Vmin, the method comprising the steps of:

determining the location of a conditional jump; and inserting code thereat for executing instructions to change program execution to a respective one of the two branches by using said distinguishing value and a base address to compute a target address, wherein for each evaluation of said condition a different number of instructions are executed, thereby minimizing the effectiveness of a differential power attack.

In a further embodiment the distinguishing value is combined with a random value, thereby adding a random number of instructions on every condition evaluation.

BRIEF DESCRIPTION OF THE DRAWINGS

These and other features of the preferred embodiments of the invention will become more apparent in the following detailed description in which reference is made to the appended drawings wherein:

FIG. 1 is schematic diagram of a conditional operation;

FIG. 2 is part of a computer program according to an embodiment of the present invention;

FIG. 3 is part of a computer program according to a further embodiment of the present invention;

FIG. 4 is part of a computer program according to a still further embodiment of the present invention.

DETAILED DESCRIPTION OF THE PREFERRED EMBODIMENTS

Figure 5:
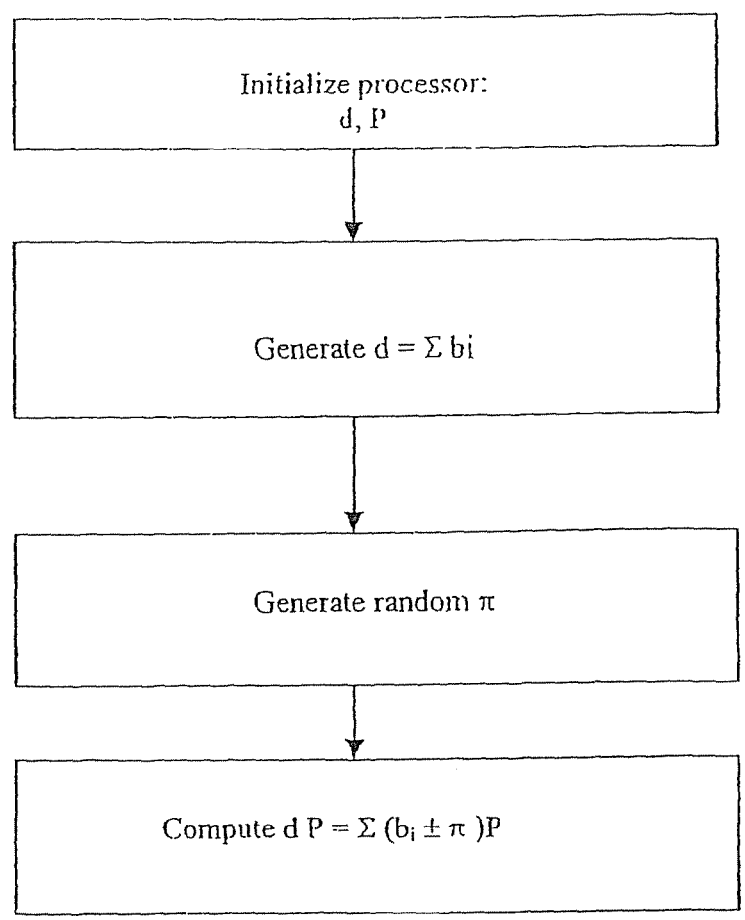
FIG. 5 is a flow diagram illustrating another embodiment of the invention.

Referring to FIG. 2, a schematic diagram of a method for masking conditional jump statements in a computer program, according to an embodiment of the present invention, is shown generally by numeral 50. We assume that the following code fragments are executed by a processor and that a distinguishing value V varies within a known range and the condition is whether a threshold value TH is crossed by the distinguishing value V or not. The threshold TH is a random number in the known range having an upper limit and a lower limit VMAX and VMIN, respectively. In a generalized embodiment, the method comprises the steps of identifying a location for a conditional jump operation, and inserting at the location a call 52 to a subroutine 54, the subroutine 54 including instructions for changing the return address of the subroutine to one of two program branches to execute branch statements1 or branch statements2 in response to the result of a comparison of the distinguishing value V to the threshold value.

As may be seen in FIG. 2, the location of the conditional jump that is replaced is identified by code block a. The subroutine is identified as IRRITATE_1 (54) and includes code blocks identified as b and c. The code block c includes a first and second sections 56 and 58, respectively. The start address of the second section 58 is predetermined and is indicated by the value KNOWN_DISPLACEMENT. The start address of the first section 56 is then determined by the difference between KNOWN_DISPLACEMENT and the upper limit of the distinguishing value V. The first section 56 consists of a series of conditional jumps to an address L1 and the second section 58 consists of a series of unconditional jumps to an address L2. The locations L1 and L2 contain code for returning program flow to execute statements1 and statements2 respectively. The code block b included in the subroutine IRRITATE_1 includes code for computing a difference between the KNOWN_DISPLACEMENT address and the THRESHOLD. The resulting address is then added to the distinguishing value V to derive a target address location in one of the sections 56 or 58.

As may be seen in block a the distinguishing value V is preserved while calling the subroutine, which in turn does not contain any conditional jumps. In this subroutine we change the return address of the subroutine (which resides on the stack) depending on whether V is below or above TH in such a way that, after returning from the subroutine, the program will continue execution in the desired branch.

An addressing mode known as extended addressing is used to determine the target address. With extended addressing the address at which the execution of the program has to continue is computed as the sum of the content of two registers. For example JMP @A+DPTR in the assembly language of the Intel 8051 family means that the address at which the program execution has to continue is computed by adding the content of the accumulator A and the data pointer DPTR. Other processors may support similar mechanisms for addressing. The code fragments shown in FIG. 2 illustrate the method. To refer to lines of these code fragments we use labels consisting of a letter and a number. Thus to implement this method we have to specify:

a) the address at which the block of code 56 is going to reside. That would be the address of the first JMP L1;

b) the range of the distinguishing value V; and c) the maximum value of the random threshold TH. This maximum value or a value derived from it will define the size of the code block containing the JMP L1 and JMP L2 instructions.

The operation of the code fragments shown in FIG. 2 will be discussed below. The code fragments may be located within a loop, which sequentially changes the value of V in a given range for iterations of the loop. For example V may the value of the loop counter. The goal is to continue execution at the label DO_REAL, line d1, as long as V<THRESHOLD and continue execution of instructions at the label DO_VOID, line e1, for V>=THRESHOLD.

As mentioned earlier the THRESHOLD value is a random value within the known range of Vmin and Vmax. At line a1 the distinguishing value V is stored in the accumulator of the processor and the subroutine IRRITATE_1 is called at line a2. The return address from this subroutine will be line a3, which is automatically stored on the stack by the processor.

The KNOWN_DISPLACEMENT in line b1 is a constant value that specifies the beginning location of the second section 58 and indicates the address of line c9. Thus KNOWN_DISPLACEMENT-Vmax is the address of line c1, the beginning location of the first section 56.

In Block b the value of KNOWN_DISPLACEMENT is stored in a register at line b1. Next at line b2 the register is updated with the difference of KNOWN_DISPLACEMENT and THRESHOLD. This difference is moved to in DPTR at line b3. Thus, DPTR contains the address of one of the lines c1 through c8 in block c. For example for THRESHOLD=3 DPTR would point to line c6. Assume next V and thus the contents of the accumulator can vary from 0 (Vmin) to 7 (Vmax). Then since DPTR may vary from the address of c1 to c8, the address @A+DPTR computed at line b4 can vary from the address of line c6 through c12 as V varies from 0 to 7. Therefore, for V<3 the JMP L1 instructions in the first section will be executed and for V>=3 the JMP L2 instructions in the second section will be executed.

The labels L1 and L2 point to addresses located at lines c17 and c21 respectively. In lines c17 through c19 the return address of the subroutine IRRITATE_1 is retrieved and changed such that the program counter will point to line a3 after returning from the subroutine. In lines c21 through c23 the return address of the subroutine IRRITATE_1 is also retrieved and changed such that the program counter will point to line a4 after returning from the subroutine. The simple jump instructions at lines a3 and a4

It may be noted that the actual distinction between the two branches to be taken is decided at lines c18 and c22 where the retrieved subroutine return address is changed to the appropriate line in block a. In the present embodiment values of 0 and 1 have been chosen since the redirection jump instructions were located immediately after the call instruction to the subroutine IRRITATE_1, at lines a3 and a4 respectively. In other implementations different values with equal number of is in their binary presentation may be used so that the difference in the add operations at lines c18 and c22 is indistinguishable to an attacker. In this case an appropriate number of NOP's would be added to code block a in order to adjust the return addresses.

Furthermore, the jump instructions in lines a3 and a4, which redirect program flow to statements1 and statements2 respectively, should be placed at addresses with the same number of 1's in their binary representation. This would result in homogenous power consumption on the address bus while addressing these two different locations. The same precaution applies to the lines d1 and c1, the beginning location of statements1 and statements2 respectively. In addition, in line b2 special attention should be paid to the choice of values of THRESHOLD and KNOWN_DISPLACEMENT to avoid changes in flags in the processors status word while the SUB instruction is being executed.

Referring to FIG. 3, a second embodiment of the present invention is shown generally by numeral 100. This embodiment also utilizes extended addressing as described earlier. Again, assembly language of the Intel 8051 family of processors is used to illustrate the method. For clarity the symbols op1 through op7 are used to represent program instructions. In this embodiment, the distinguishing value V is one of two distinct values Vmax and Vmin, rather than a range of values. Thus, the condition in this case is when the distinguishing value V is one or the other of the distinct values Vmax or Vmin. Once again a call to a subroutine is inserted at a conditional jump location, the subroutine including instructions for changing the return address of the subroutine to one of two program branches to execute branch statements1 or branch statements2 in response to the distinguishing value V being one of the two distinct values Vmax or Vmin.

As may be seen in FIG. 3, the location of the conditional jump that is replaced is identified by code block f. The subroutine is identified as IRRITATE_2 (102) and includes code blocks identified as blocks g, h and i. The code block h also includes first and second sections 106 and 108, respectively. Each of the sections contain a series of dummy operations op1 indicated at lines h1 through h7 and at lines h12 through h18. Each of the sections is terminated by a sequence of instructions for retrieving the return address of the subroutine IRRITATE_2 and changing it such that the program counter will point to line f4 or f5 after returning from the subroutine. The lines f4 and f4 include jumps to one of the two branches indicates as block i and block j which contain statements1 and statements2 respectively.

The target destination address is comprised of two components, namely the distinguishing value V or a value derived from V and a random number MASKED_RANDOM, that are added at line g1. The beginning address of the first and second sections are chosen such that this target address is either in the range of lines h1 through h8 or h12 through h19. Since, the second component of the target address is a random number, a random number of dummy operations will be executed before the return address of the subroutine IRRITATE_2 is computed at lines h8 to h10 (or h19 to h21).

As in the previous embodiment the ADD values at lines h9 and h20 may be chosen to have the same hamming weight (number of 1's), with appropriate number of NOP instructions added to block f. In addition the jump instructions at lines f4 and f5 may be placed at addresses with the same number of one's. Additional JMP instructions may also be inserted between the lines h1 and h8 with a destination in the same segment.

This embodiment thus uses unconditional jumps instead of conditional jumps and adds a random number of dummy operations to the code. The former property is a countermeasure against SPA and the latter makes DPA attacks more difficult. In particular this embodiment adds a random mask or noise to the program execution path since the jump to a random address within a segment causes program execution of a random number of operations before one of the branches is executed. Therefore each time one of the branches is executed, the number of operations performed by the processor varies randomly making DPA attacks more difficult.

In the above embodiments, a subroutine is used to redirect program flow, however in FIG. 4, a simple series of jumps are used. The invention is thus not restricted to the embodiments shown.

Referring to FIG. 5 an embodiment of a method for masking a private key or secret value used in a cryptographic operation is shown generally by numeral 200. The method comprises the steps of dividing a secret value into a plurality of parts and combining with each part a random value modulo n (where n is the number of points on the elliptic curve) to derive a new part such that the new parts are combined to be equivalent to the original secret value and utilizing each of the individual parts in the operation. Typically, the secret value is a private key, which is used to compute a public key, and more frequently used in signatures, decryption and possible key exchange protocols, such as Diffie-Hellman key exchange.

For illustrative purposes, we will in the following discussion assume an elliptic curve (EC) scheme, where P is a point on the elliptic carve. The secret key d is normally combined with the point P to derive dP, the public key. However, the private key may also be used more frequently in various other cryptographic operations as described above. The cryptographic processor is generally initialized at manufacture time with the public key or secret value d. Initially, the value d may be divided into a number of parts, e.g. $d=b_{10}+b_{20}$.

In a first step the bi's are initialized to $b_1=b_{10}$ and $b_2=b_{20}$ such that $d=b_{10}+b_{20}$. These initial values of $b_1$ and $b_2$ are stored instead of d. Alternatively the d value may also be stored if so desired, however in the case of a smart card where memory is limited this may not be desirable.

Typically when a computation using the value d is required, at a next step, a random number $\pi$ is generated and values $b_1$ and $b_2$ are updated as follows:

$$b_1 = b_1 + \pi \bmod n$$

$$b_2 = b_2 - \pi \bmod n.$$

The updated values $b_1$ and $b_2$ are stored. Computation is then performed on the point P using the components $b_1$ and $b_2$ as follows:

$$dP \bmod n = b_1 P + b_2 P \bmod n$$

where, P is a point on the curve which is a predefined parameter of the system.

Thus assuming the value π is randomly generated for each session, then an attacker is unlikely to observe a predictable power signature.

In a typical application of the present invention a signature component s has the form:

$$s = æ + k \pmod{n}$$

where:
- k is a random integer selected as a short term private or session key;
- R=kP is the corresponding short term public key;
- r=$R_x$ x component of R
- a is the long term private key of the sender;
- Q=aP is the senders corresponding public key;
- e is a secure hash, such as the SHA-1 hash function, of a message m and the short term public key R (or possibly a short message itself); and n is the order of the curve.

The sender sends to the recipient a message including m, s and r and the signature is verified by the computing the value R=(sP−eQ) which should correspond to R. If the computed values correspond then the signature is verified. Both the secret keys in the above example may be masked using the method of the present invention.

Specifically referring back to the above example, calculation of the product w may reveal some information on some platforms in some environments. To minimize this, the present invention is applied. The product æ is computed as æ=($b_0$+$b_1$)e for ($b_0$+$b_1$)=a; where $b_0$, $b_1$ sum to a. The components $b_0$, $b_1$ are updated periodically as described above. This updating of the components can be made on every new signature operation.

In the above embodiments the secret value was divided into two components b0, b1 however this may be generalized to a plurality of components $b_0 \ldots b_{n-1}$. Furthermore the above signature scheme is used for illustrative purposes and other schemes and operations may equally well be applied using the present invention.

Although the invention has been described with reference to certain specific embodiments, various modifications thereof will be apparent to those skilled in the art without departing from the spirit and scope of the invention as outlined in the claims appended hereto.

What is claimed is:

1. A computer-implemented elliptic curve digital signature method comprising:
    generating multiple signature components by combining each of multiple private values with a hash of a message, a sum of the private values, modulo a specified integer, being equal to an elliptic curve private key; and
    generating, by one or more processors, a digital signature of the message by combining the signature components.

2. The method of claim 1, further comprising updating at least two of the private values based on one or more random values before generating the signature components.

3. The method of claim 1, comprising generating a digital signature of the message using the private values instead of the elliptic curve private key, wherein the digital signature can be verified using an elliptic curve public key corresponding to the elliptic curve private key.

4. The method of claim 1, wherein combining each of multiple private values with a hash of a message includes multiplying each individual private value by the hash, and combining the signature components includes summing the signature components.

5. The method of claim 1, further comprising sending the digital signature and the message to a correspondent.

6. A non-transitory computer-readable medium storing instructions that, when executed by one or more processors, perform operations comprising:
    generating multiple signature components by combining each of multiple private values with a hash of a message, a sum of the private values, modulo a specified integer, being equal to an elliptic curve private key; and
    generating a digital signature of the message by combining the signature components.

7. The computer-readable medium of claim 6, the operations further comprising updating at least two of the private values based on one or more random values before generating the signature components.

8. The computer-readable medium of claim 6, the operations comprising generating a digital signature of the message using the private values instead of the elliptic curve private key, wherein the digital signature can be verified using an elliptic curve public key corresponding to the elliptic curve private key.

9. The computer-readable medium of claim 6, wherein combining each of multiple private values with a hash of a message includes multiplying each individual private value by the hash, and combining the signature components includes summing the signature components.

10. The computer-readable medium of claim 6, the operations further comprising sending the digital signature and the message to a correspondent.

11. A device comprising:
    memory; and
    one or more processors operable to:
        generate multiple signature components by combining each of multiple private values with a hash of a message, a sum of the private values, modulo a specified integer, being equal to an elliptic curve private key; and
        generate a digital signature of the message by combining the signature components.

12. The device of claim 11, the one or more processors further operable to update at least two of the private values based on one or more random values before generating the signature components.

13. The device of claim 11, the one or more processors operable to generate a digital signature of the message using the private values instead of the elliptic curve private key, wherein the digital signature can be verified using an elliptic curve public key corresponding to the elliptic curve private key.

14. The device of claim 11, wherein combining each of multiple private values with a hash of a message includes multiplying each individual private value by the hash, and combining the signature components includes summing the signature components.

15. The device of claim 11, the one or more processors further operable to send the digital signature and the message to a correspondent.

* * * * *

UNITED STATES PATENT AND TRADEMARK OFFICE
CERTIFICATE OF CORRECTION

PATENT NO. : 8,660,264 B2
APPLICATION NO. : 13/621021
DATED : February 25, 2014
INVENTOR(S) : Farhad Pezeshki et al.

It is certified that error appears in the above-identified patent and that said Letters Patent is hereby corrected as shown below:

Title Page, Item (73) (Assignee), Delete "CA (US)" and insert -- (CA) --, therefor.

Title Page, Item (63) Column 1, Line 6 (Related U.S. Application Data), Delete "which is" and insert -- and --, therefor.

Signed and Sealed this
Twenty-seventh Day of May, 2014

Michelle K. Lee
*Deputy Director of the United States Patent and Trademark Office*